[19] United States Patent
Robison

[10] Patent No.: US 6,718,687 B2
[45] Date of Patent: Apr. 13, 2004

(54) MOSQUITO TRAP

(76) Inventor: Mary Robison, 184 Holliday Trace, Raymond, MS (US) 39154

( * ) Notice: Subject to any disclaimer, the term of this patent is extended or adjusted under 35 U.S.C. 154(b) by 0 days.

(21) Appl. No.: 10/151,154

(22) Filed: May 21, 2002

(65) Prior Publication Data

US 2003/0217503 A1 Nov. 27, 2003

(51) Int. Cl.⁷ .................................................. A01M 1/14
(52) U.S. Cl. ........................................... 43/114; 43/113
(58) Field of Search .......................... 43/113, 114–116

(56) References Cited

U.S. PATENT DOCUMENTS

| 4,808 A | * | 10/1846 | Wilt | 43/113 |
| 130,390 A | * | 8/1872 | Pugh | 43/113 |
| 166,124 A | * | 7/1875 | McQueen | 43/113 |
| 455,403 A | * | 7/1891 | Hooper | 43/113 |
| 925,616 A | | 6/1909 | Weinfeld | |
| 1,505,651 A | | 8/1924 | Loeschen | |
| 1,561,832 A | * | 11/1925 | Corsi et al. | 43/115 |
| 1,996,293 A | | 4/1935 | House | |
| 2,046,430 A | | 7/1936 | Rutherford | |
| 2,086,046 A | | 7/1937 | Preston | |
| 3,997,999 A | | 12/1976 | Evans | |
| 4,283,878 A | | 8/1981 | Hill et al. | |
| 4,411,093 A | * | 10/1983 | Stout et al. | 43/114 |
| 4,519,776 A | * | 5/1985 | DeYoreo et al. | 431/328 |
| 4,577,434 A | | 3/1986 | Davis | |
| 4,907,366 A | | 3/1990 | Balfour | |
| 5,048,224 A | | 9/1991 | Frisch | |
| 5,203,816 A | | 4/1993 | Townsend | |
| 5,231,790 A | | 8/1993 | Dryden et al. | |
| 5,749,168 A | | 5/1998 | Chrysanthis | |
| 6,032,406 A | * | 3/2000 | Howse et al. | 43/114 |
| 6,209,256 B1 | * | 4/2001 | Brittion et al. | 43/107 |
| 6,267,953 B1 | * | 7/2001 | Bernier et al. | 424/84 |
| 6,481,152 B1 | * | 11/2002 | Gray | 43/113 |

* cited by examiner

Primary Examiner—Charles T. Jordan
Assistant Examiner—Bret Hayes
(74) Attorney, Agent, or Firm—Jacobson Holman PLLC

(57) ABSTRACT

A mosquito trap, capable of trapping and killing a very high percentage of mosquitoes by attracting and killing mosquitoes simply, safely and effectively. The trap utilizes the attractant lactic acid applied to easily replaceable adhesive panels located inside the trap. A mesh screen located outside of the treated panels and having particular sized openings, allows only mosquitoes and smaller insects to fly into the mosquito trap and prevents contact with the adhesive panels from outside sources. Mosquitoes are attracted by the glossy, contrasting colors of the trap. Mosquitoes are then drawn into the trap by the lactic acid, are trapped by the non-drying adhesive and die. To enhance the attractiveness of the trap to mosquitoes, a light/heat source such as a candle can optionally be used. The candle can be treated with the attractant lactic acid also. A burning candle produces light, heat, and $CO_2$, all of which act as attractants to mosquitoes.

19 Claims, 6 Drawing Sheets

MOSQUITO TRAP

FIELD OF THE INVENTION

The present invention is directed to a mosquito trap specifically for trapping and killing mosquitoes and smaller sized insects by use of specific sized mesh openings, lactic acid treated adhesive panels, glossy contrasting colors and optionally including a heat, light and carbon dioxide source.

BACKGROUND OF THE INVENTION

Mosquitoes belong to a group of insects that requires blood to obtain protein necessary for egg development. Males do not require a blood meal, thus they do not bite. The multiple batches of eggs must be laid in water for the developing larvae to hatch. The development from egg to mosquito takes from 9 to 14 days. A mosquito bite can cause severe skin irritation through an allergic reaction to the mosquito's saliva, which causes the red bump and itching.

A more serious consequence of some mosquito bites may be transmission of certain serious diseases such as malaria, dengue fever, several forms of encephalitis and most recently, west Nile virus. Not only can mosquitoes carry diseases which afflict humans, but they also can transmit several diseases and parasites that animals such as dogs and horses are very susceptible to. These include dog heartworms and eastern equine encephalitis. The first blood meal taken by the young adult female does not transmit disease. The older female, if she has picked up a disease organism in her first blood meal, can then transmit the disease during the second blood meal.

A mosquito has a battery of sensors that are triggered by certain chemical, visual and temperature changes, all of which are embodied in this mosquito trap. The primary cue to a potential host's location is a change in the $CO_2$ level of the air. A host-seeking mosquito is guided to an individual by following the slipstream of $CO_2$ that is exhaled from a person or animal's breath. Once the mosquito has landed, the mosquito relies on a number of short-range triggers to determine if an individual is an acceptable blood meal host. Warmth and light attract mosquitoes too. Contrasting colors and dark, shiny colors especially, attract mosquitoes through their visual sensors. Perspiration and skin secretions contain Lactic Acid in the form of the L+ isomer. Mosquitoes find this lactic acid irresistible. A combination of some or all of the attractants is found on humans on a warm summer day.

DESCRIPTION OF THE PRIOR ART

A number of insect traps have been invented to trap and kill many different types of insects, moths and flies. Under this same premise, devices have been invented to drive insects away from human gatherings. Many different methods have been used and have achieved some degree of success in indiscriminate trapping of insects such as flies, moths, beetles and fleas, for example, but not specifically for immediate and successful trapping of adult, biting mosquitoes, 'no-see-ums' and gnats. The prior art demonstrates that a practical, all-inclusive and effective method of immediate mosquito control, without the dependence on additional time-consuming, messy and costly means to finish the process, is not accomplished.

U.S. Pat. No. 3,997,999 is a mosquito trap that lures adult mosquitoes into laying eggs in the water trap, that then after developing in adult mosquitoes are trapped inside. There is no method to keep the original adult from biting or from laying eggs elsewhere.

U.S. Pat. No. 4,283,878 requires filling a reservoir with a chemical attractant to attract flies and other insects.

An electrical heater to attract mosquitoes and a pesticide that is continually expelled into the surrounding air were used. Zero flies were caught in this trap without the use of an electrical heater.

U.S. Pat. No. 4,907,366 describes a mosquito control device to lure mosquitoes away from human gatherings, not an actual trap. By luring mosquitoes away from an area without killing them, they can return later to bite. Blowing lactic acid into the surrounding area will attract mosquitoes, but with a breeze could send it into areas of human gatherings. The mosquitoes are exterminated by someone else's design to 'destroy by heat, electrocution or the like'. This design requires that dry ice be used to create carbon dioxide, which must be replaced often. It also requires access to electricity to run the heater and blower fan.

U.S. Pat. No. 5,048,224 is an insect trap geared to catching flies and incorporating cardboard punch-outs to prevent visual contact with the dying flies. The trap can be used for a mosquito trap if dusted with a packet of powdered chemical insect attractant without specifying any that is available for mosquitoes. No protective grid is provided to keep out other bugs, insects, butterflies, moths, wasps or birds looking for insects to eat that could get stuck and/or injured. These traps indiscriminately catch beneficial insects and butterflies.

Electrocuting traps i.e., 'bug zappers' are not effective in reducing or eliminating mosquito populations. According to a study at the University of Delaware, less than ¼ of 1% of insects "zapped" were found to be biting insects. The majority of insects killed were actually beneficial insects caught in the non-discriminating trap.

The Naval Medical Research Center has stated: "Octenol (1-octen-3-oL) is not an effective attractant for mosquitoes unless $CO_2$ was also used. Results from traps baited with Octenol and $CO_2$ were not significant when compared with $CO_2$ alone. This test shows that at the release rate tested, Octenol was not an effective attractant for the mosquito species collected during the course of this study." www.n-mri.nnmc.navy.mil Accordingly, there is a great need for an insect trap specific to adult biting mosquitoes. Besides reduction of transmission of potentially fatal diseases, there is a desire to spend outdoor time without the annoyance of mosquito bites and their resultant effects.

SUMMARY OF THE INVENTION

The present invention contains all of the known attractants for mosquitoes and especially a more concentrated level of lactic acid to effectively attract and kill the mosquito and smaller stinging gnats and 'no-see-ums'. The additional safety features and simplicity of the design make it a very effective, attractive and economic means to reduce the mosquito population. The need for a mosquito trap that can effectively lure mosquitoes in and exterminate them economically, ideally when they are seeking their first blood meal and thus preventing a returning blood seeking mosquito, is fulfilled by this invention.

Accordingly, the present invention is a practical and economical trap to effectively kill mosquitoes. The trap uses no pesticides or similar products to repel mosquitoes to only come back later to bite again, but rather attracts only mosquitoes and smaller biting gnats and kills them, effectively reducing the population and the disease mosquitoes transmit.

The trap works by utilizing the attractant lactic acid which is already applied to adhesive panels located inside the trap. Mosquitoes are drawn into the trap by the lactic acid, trapped by the adhesive and then die. To enhance the attractiveness of the trap to mosquitoes, a light/heat source such as a candle can optionally also be used. The additional heat also dehydrates the dead mosquitoes, thus taking up very little space on the adhesive panels. The candle can also be treated with lactic acid. A burning candle produces light, heat and $CO_2$, all of which act as attractants to mosquitoes. The trap has a glossy dark color with a light background. The contrasting glossy colors are attractive to mosquitoes.

The trap can be in any number of configurations. A preferred embodiment can have the appearance of a decorative patio lamp and is 9⅓ inches tall and 6⅓ inches wide, made of a glossy dark color plastic. Transparent or translucent adhesive panels are located inside the trap with an optional candle or light source located centrally between the adhesive panels.

The top and base of the trap are attached by a vertical, extending, grooved, post at each corner. The posts at the corners hold removable screens in place. The screens prevent unwanted objects from exposure to the adhesive panels and candle. The screens include openings preferably dimensioned to be one-half inch by one-half inch, which is the optimal sized opening to allow mosquitoes into the trap, but to prevent flies and larger sized insects from entering the trap.

The base of the trap contains narrow slots on each side to hold the adhesive panels that are treated with lactic acid. The adhesive panels are easily replaceable, as is the centrally located candle. The adhesive panels have a strip at the top, sides and bottom edge that is adhesive-free. The slots in the base have a 45-degree chamfer on the outer edges to facilitate the insertion of the adhesive panels into the slot. The base also has a depression in the middle to hold a slow burning, unscented candle that has been treated with lactic acid.

A groove on the base of the trap, between the posts, guides the screens when slid into place. The top and base can be of the same design, except the top has a handle attached to two holes.

To operate the trap for the first time, one of the screens is first slid out. A candle is placed on the base and the candle is lit. The screen is then slid back into place. Protective paper is peeled from the face of the adhesive panels. The very top of each panel is gripped where there is no adhesive. The panel is slid through a wide slot in the top. This slot is chamfered and wider at its top leading into a narrow parallel walled groove supporting the opposite sides of the adhesive panel.

The adhesive used remains tacky over a prolonged period of time and its ultra-violet (UV) resistance is rated excellent. The trap is made entirely of non-hazardous ingredients. The adhesive has the following qualities: Department of Transportation (DOT) category—non-flammable; flashpoint—450 degrees; health hazards—none.

The lactic acid used as an attractant on the adhesive panels is a natural L+ isomer and is the same as lactic acid excreted by humans. Lactic acid is produced by fermentation from sugar and is used in the food industry to preserve and flavor, passing Food and Drug Administration (FDA) testing, but kills mosquitoes. Production of the lactic acid is based on renewable resources. Flash point—0; non-hazardous; chemically stable.

Mosquito Trap Features

No electricity or replaceable power sources, such as batteries, are needed. No access to power supply is required. It contains no electrical parts to corrode or replace. Optional heat/light/$Co_2$ source is paraffin based. The trap is also quite effective without any light or heat source, so it is a very inexpensive stand alone disposable unit.

No poisons, insecticides, odiferous or separate baits have to be applied by the user. Lactic acid attracts and kills mosquitoes and smaller sized insects only, so disposal of larger insects is not required, and larger insects do not take up space on the adhesive panels. The strength of the lactic acid used is safe to humans and animals, but actually kills mosquitoes without attracting beneficial insects. All chemicals and adhesives used are non-toxic to humans and pets.

Mesh is used to prevent contact with adhesive by humans or animals and the mesh openings are sized to only allow mosquitoes and smaller insects to pass therethrough. Adhesive panels include all attractants and can last for weeks or months.

It is therefore an object of the present invention to provide a mosquito trap limited to trapping insects of the size of a mosquito and smaller.

It is another object of the present invention to provide a mosquito trap limited to trapping insects of the size of a mosquito and smaller by allowing the mosquitoes to pass through a screen opening and engaging an adhesive surface.

It is still yet another object of the present invention to provide a mosquito trap limited to trapping insects of the size of a mosquito and smaller by allowing the mosquitoes to pass through a screen opening and engaging an adhesive surface, with the adhesive including a lactic acid attractant and with a candle being located behind the adhesive panel, the light of the candle being visible through the adhesive panel.

It is still yet another object of the present invention to provide a mosquito trap limited to trapping insects of the size of a mosquito and smaller by allowing the mosquitoes to pass through a screen opening and engaging an adhesive surface, with the adhesive including a lactic acid attractant and with a candle being located behind the adhesive panel, the light of the candle being visible through the adhesive panel and the candle including lactic acid to provide a further attractant as well as being a carbon dioxide, heat and light source.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
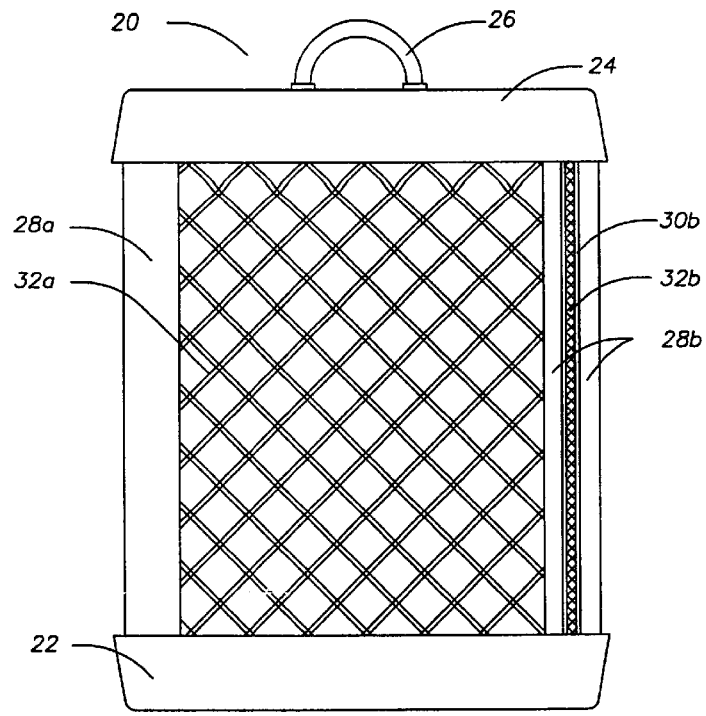
FIG. 1 is a side view of the mosquito trap.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents, which operate in a similar manner to accomplish a similar purpose.

Figure 2:
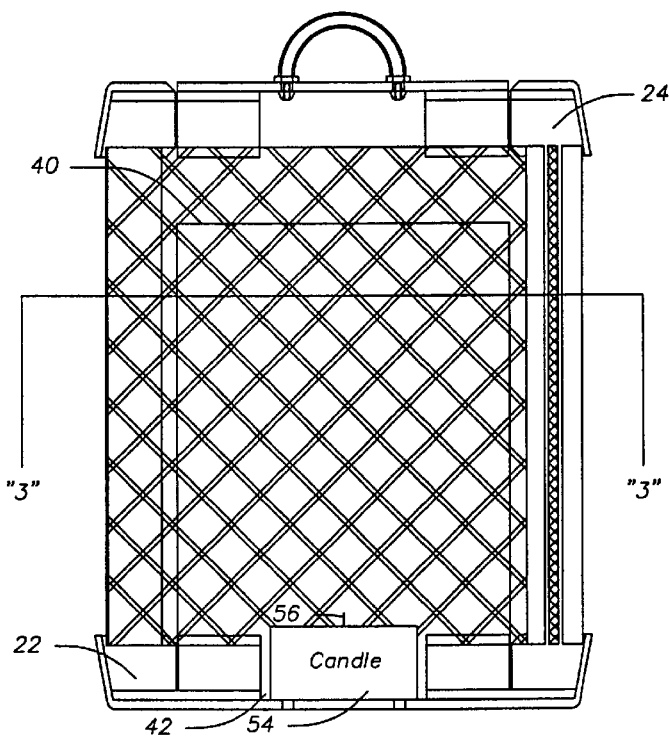
FIG. 2 is a cross-sectional view of the mosquito trap shown is FIG. 1.
Figure 3:
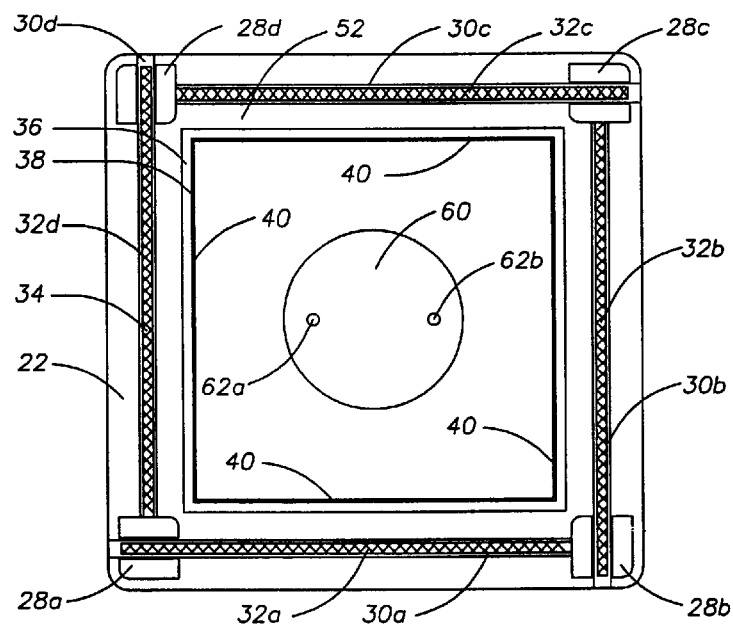
FIG. 3 is a sectional view taken along line 3—3 of FIG. 2.

With reference to the drawings, in general, and to FIGS. 1 through 3, in particular, a mosquito trap embodying the teachings of the subject invention is generally designated as 20. With reference to its orientation in FIG. 1, the mosquito trap 20 comprises a base 22 and a top 24 including a handle 26.

Figure 9:
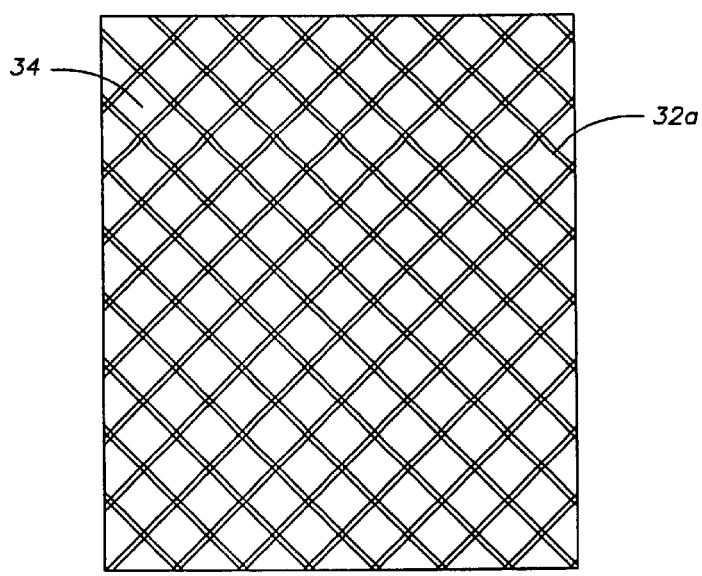
FIG. 9 is a front view of the screen panel.

Four vertically extending posts 28a, 28b, 28c and 28d interconnect the base 22 and top 24. Each of the posts includes a slot 30a, 30b, 30c and 30d, respectively, for receipt of a screen panel 32a, 32b, 32c and 32d, respectively. The base 22, top 24, posts 28a, 28b, 28c and 28d and the mesh of the screen panels are made of a glossy dark colored plastic. A representative screen panel is shown in FIG. 9 having one half inch by one half inch mesh openings 34. This size opening allows mosquitoes and smaller sized insects (such as biting gnats and "no-see-ums") into the interior of the trap and prevents other insects from entry. The screen panel also prevents humans and animals from coming into contact with the interior of the trap.

Figure 12:
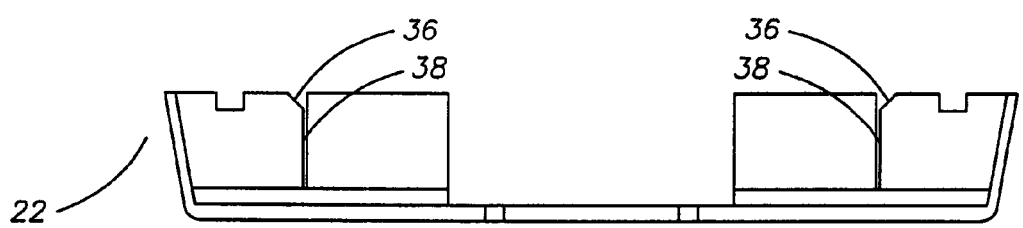

As shown in FIG. 3, the base 22 includes, spaced inwardly of the four screen panels 32a through 32d, a 45 degree angled surface 36 which leads into a parallel walled slot 38. As shown in cross-section in FIG. 12, the angled surface 36 provides a guiding, leading edge into the slot 38.

Figure 10:
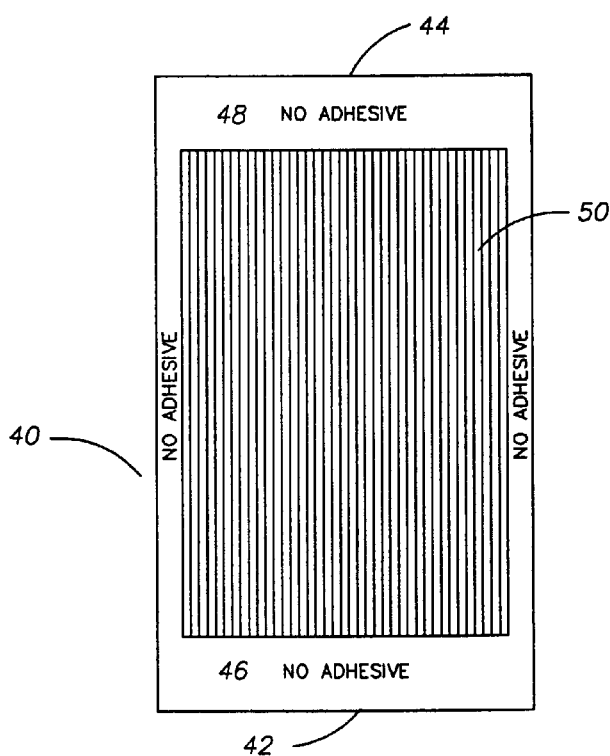
FIG. 10 is a front view of the adhesive panel

The slot 38 is used to support an adhesive panel 40 as shown in FIG. 10. The panel is made of a transparent or translucent polyester film. The adhesive panel provides a contrast in color from the surrounding base, top, posts and screen material, which proves to be an attractant to mosquitoes.

The top edge 44, bottom edge 42 and side edges of the panel 40 include portions 46 and 48 which are devoid of adhesive. Central section 50 of the panel includes an adhesive, which will retain a flying insect upon contract. Section 50 is treated with lactic acid serving as an attractant to the mosquitoes, and kills them.

Figure 4:
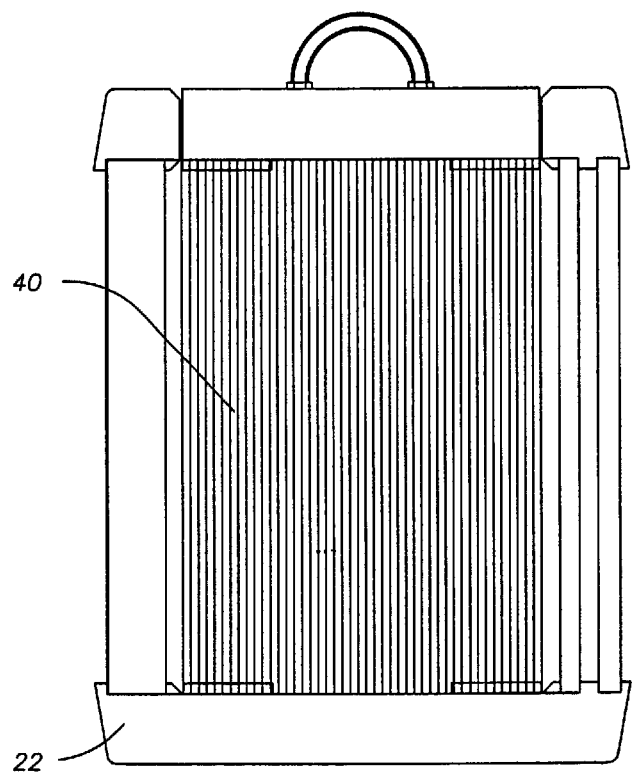
FIG. 4 is a side view of the trap, with the protective screens removed and adhesive panels in place.

As shown in FIG. 3, the panel 40 is positioned in the interior 52 of the trap and is located behind the screen panels 32a through 32d. Accordingly, mosquitoes must pass through the screen opening 34 before encountering the adhesive panels 40 as supported in slots 38. As schematically shown in FIG. 4, the screen panels have been removed to reveal the adhesive panels 40 that are located behind the screen panels.

Optionally, as shown in FIG. 2, a candle 54 (having dimensions of one inch tall by two inches in diameter or one inch tall by three inches in diameter) having a wick 56 is located in the interior 42 of the base 22. The candle is located centrally with respect to the base, inside of the four adhesive panels 40. The candle is treated with lactic acid as an attractant. The candle also produces light, heat and carbon dioxide as a further attractant to mosquitoes.

Figure 5:
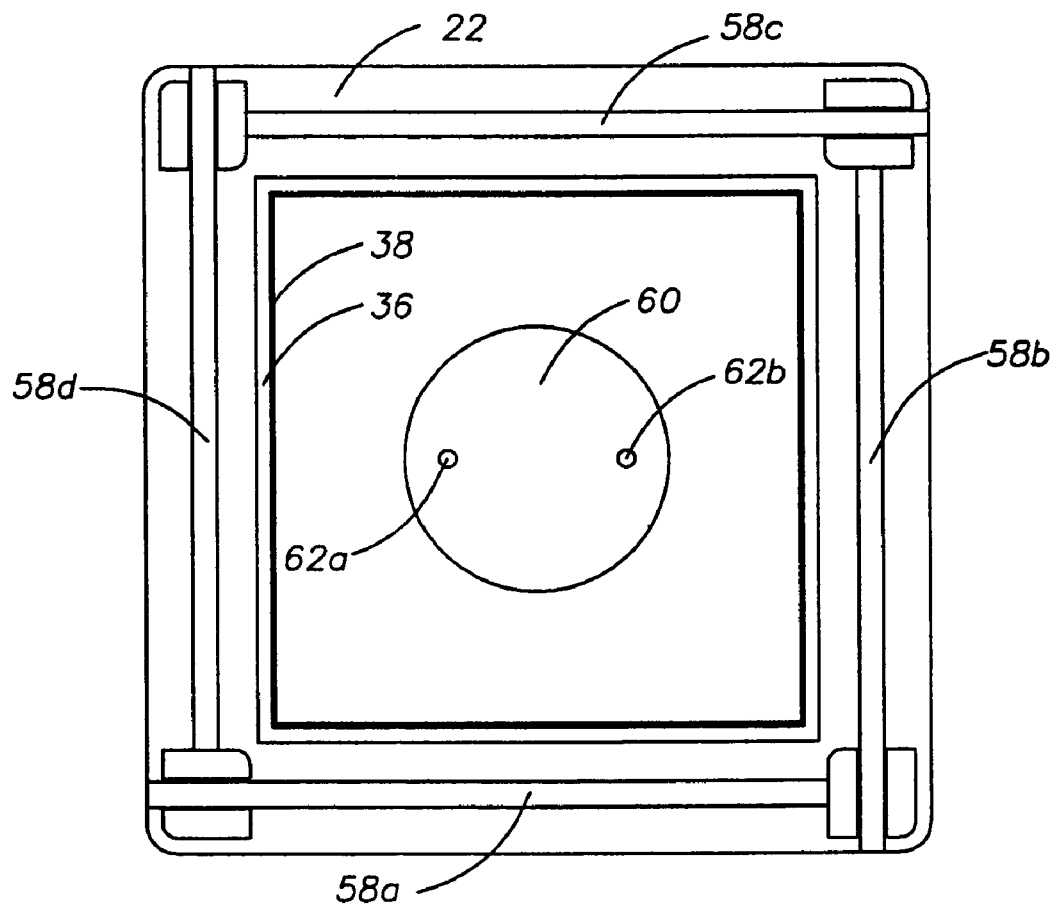
FIG. 5 is a plan view of the base.
Figure 6:
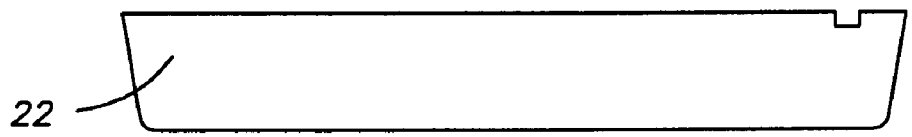
FIG. 6 is a side view of the base.
Figure 7:
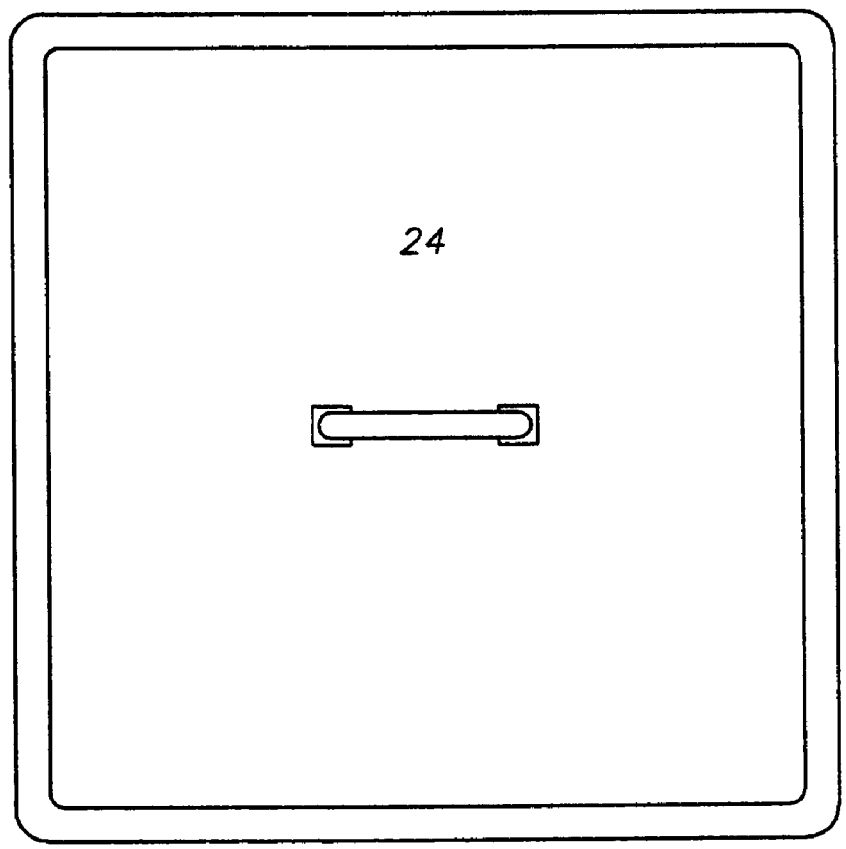
FIG. 7 is a plan view of the top.
Figure 8:
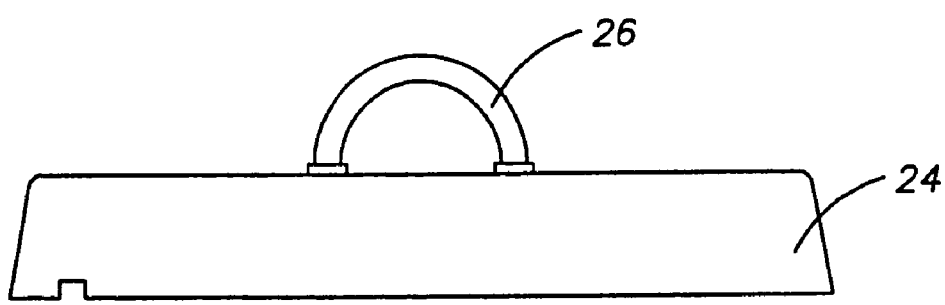
FIG. 8 is a side view of the top.

To light the candle, one of the screen panels is slid out of the groove 58a, 58b, 58c or 58d of the base and from between the opening of the appropriate post, as illustrated in FIG. 5. This provides access to the wick of the candle 54. A support plate 60 for the candle 56 is also located in the base 22.

Figure 11:
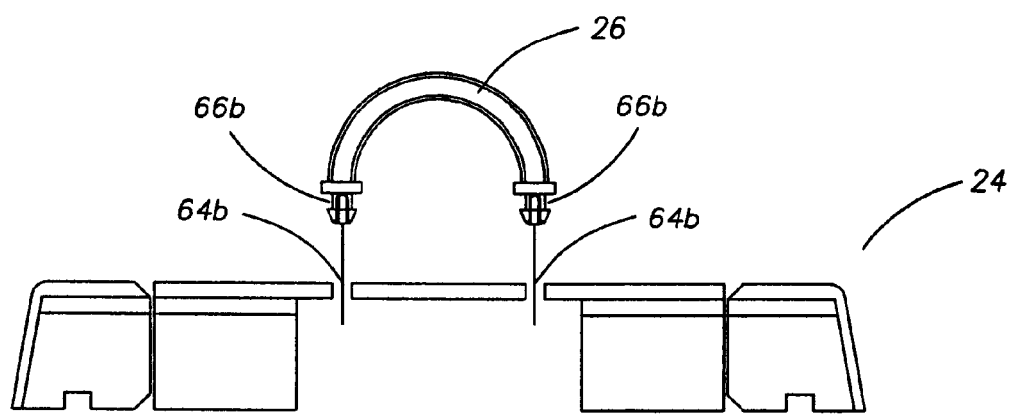
FIGS. 11 and 12 are sectional views of the top and base, respectively.

In FIG. 11, the top 24 is an upside down version of the base, the base and the top being identical. The holes 64a, 64b in the top are used to engage and secure projections 66a, 66b of the handle 26.

Testing

One trap consisting of four treated panels with screens and a candle was placed outdoors under natural conditions in central Mississippi for four days. The candle was burned for only four hours per 24 hour period. A total of 166 mosquitoes were trapped and killed. No other insects were trapped.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A portable mosquito trap for use in remote locations in the absence of a source of electric power, said portable mosquito trap comprising:

a base, a top supported by the base, at least one grid screen panel mounted on the base for allowing passage there through of insects of a size equal to or less than mosquitoes, at least one adhesive panel treated with a mosquito specific attractant for only luring in and retaining only insects of a size equal to or less than mosquitoes able to pass through the at least one screen panel, said at least one adhesive panel being viewable through said at least one grid screen panel and said at least one adhesive panel being one of transparent and translucent material for viewing through said at least one adhesive panel, and a source of heat, light and carbon dioxide to attract mosquitoes being positionable on said base for viewing through said at least one grid screen panel and said at least one adhesive panel.

2. The mosquito trap as claimed in claim 1, wherein the base and the top are interconnected by a plurality of posts.

3. The mosquito trap as claimed in claim 1, wherein the base and the top are of a glossy, dark color.

4. The mosquito trap as claimed in claim 2, wherein the plurality of posts allow removal of the at least one grid screen panel by sliding of the at least one grid screen panel from between the base and the top.

5. The mosquito trap as claimed in claim 1, wherein the at least one arid screen panel has mesh openings of approximately one half inch by one half inch.

6. The mosquito trap as claimed in claim 1, wherein a candle is mounted on the base as the source of heat, light and carbon dioxide to attract mosquitoes.

7. The mosquito trap as claimed in claim 6, wherein the at least one grid screen panel, the at least one adhesive panel and the candle are progressively arranged from an exterior of the trap to an interior of the trap.

8. The mosquito trap as claimed in claim 1, wherein a portion of the adhesive panel is devoid of adhesive to facilitate handling of the at least one adhesive panel.

9. The mosquito trap as claimed in claim 1, wherein the at least one adhesive panel is treated with lactic acid.

10. A portable mosquito trap using several mosquito specific attractants for luring in and retaining insects of a size equal to or smaller than mosquitoes at a remote location in absence of a source of electric power, said portable mosquito trap comprising:

a base, a top interconnected with the base, a plurality of arid screen panels mounted between the base and the top, a plurality of adhesive panels spaced inwardly from the plurality of screen panels, said adhesive panel including an attractant specific to luring mosquitoes and insects of a size smaller than mosquitoes through the screen panels into contact with the adhesive panels, where the mosquitoes and insects of a size smaller than mosquitoes die, said at least one adhesive panel being viewable through said grid screen panels and said adhesive panels being one of transparent and translucent material for viewing through said adhesive panels, and a source of heat, light and carbon dioxide to attract mosquitoes being positionable on said base for viewing through said grid screen panels and said adhesive panels.

11. The mosquito trap as claimed in claim 10, wherein the base and the top are interconnected by a plurality of posts.

12. The mosquito trap as claimed in claim 10, wherein the base and the top are of a glossy, dark color.

13. The mosquito trap as claimed in claim 11, wherein the plurality of posts allow removal of at least one of plurality of grid screen panels by sliding of at least one of the plurality of grid screen panels from between the base and the top.

14. The mosquito trap as claimed in claim 10, wherein the plurality of grid screen panels have mesh openings of approximately one half inch by one half inch.

15. The mosquito trap as claimed in claim 10, wherein a candle is mounted on the base as the source of heat, light and carbon dioxide to attract mosquitoes.

16. The mosquito trap as claimed in claim 15, wherein the plurality of grid screen panels, the plurality of adhesive panels and the candle are progressively arranged from an exterior of the trap to an interior of the trap.

17. The mosquito trap as claimed in claim 10, wherein a portion of the plurality of adhesive panels is devoid of adhesive to facilitate handling of the plurality of adhesive panels.

18. The mosquito trap as claimed in claim 10, wherein the plurality of adhesive panels is treated with lactic acid.

19. A portable mosquito trap for use in remote locations in the absence of a source of electric power, said portable mosquito trap comprising:

a base, a top supported by the base, at least one crid screen panel mounted on the base, said at least one grid screen panel having mesh openings of approximately one half inch by one half inch for allowing passage there through of only insects of a size equal to or lees than mosquitoes, at least one adhesive panel treated with a mosquito attractant for luring in and retaining insects of a size able to pass through the at least one screen panels said at least one adhesive panel being viewable through said at least one grid screen panel and said at least one adhesive panel being one of transparent and translucent material for viewing through said at least one adhesive panel, and a source of heat, light and carbon dioxide to attract mosquitoes being positionable on said base for viewing through said at least one grid screen panel and said at least one adhesive panel.

* * * * *